United States Patent
Fouad et al.

(10) Patent No.: US 12,261,763 B2
(45) Date of Patent: Mar. 25, 2025

(54) META-AGENT BASED ADAPTATION IN MULTI-AGENT SYSTEMS FOR SOA SYSTEM EVALUATION

(71) Applicant: The Government of the United States of America, as represented by the Secretary of the Navy, Arlington, VA (US)

(72) Inventors: Hesham Fouad, Arlington, VA (US); Stephen Russell, Laurel, MD (US); Antonio Gilliam, Hopewell, VA (US)

(73) Assignee: The Government of the United States of America, as represented by the Secretary of the Navy VA, Arlington, VA (US)

( * ) Notice: Subject to any disclaimer, the term of this patent is extended or adjusted under 35 U.S.C. 154(b) by 0 days.

(21) Appl. No.: 18/382,036

(22) Filed: Oct. 19, 2023

(65) Prior Publication Data
US 2024/0195726 A1    Jun. 13, 2024

Related U.S. Application Data

(63) Continuation of application No. 17/541,203, filed on Dec. 2, 2021, now abandoned, which is a continuation
(Continued)

(51) Int. Cl.
*H04L 43/50* (2022.01)
*H04L 41/046* (2022.01)
(Continued)

(52) U.S. Cl.
CPC ............ *H04L 43/50* (2013.01); *H04L 41/046* (2013.01); *H04L 43/10* (2013.01); *H04L 67/10* (2013.01)

(58) Field of Classification Search
CPC ....... H04L 43/50; H04L 41/046; H04L 43/10; H04L 67/10; H04L 41/048; G05B 2219/39146; G05B 2219/33277
See application file for complete search history.

(56) References Cited

U.S. PATENT DOCUMENTS 6,823,382 B2 * 11/2004 Stone .................. G06F 11/3495
709/224
7,516,112 B1 * 4/2009 Goldsmith ............. G06N 5/043
706/46

(Continued)

OTHER PUBLICATIONS

Fok, "Agilla: A Mobile Agent Middleware for Self-Adaptive Wireless Sensor Networks". (Year: 2009).*
(Continued)

*Primary Examiner* — Messeret F Gebre
(74) *Attorney, Agent, or Firm* — US Naval Research Laboratory; William P. Ladd

(57) ABSTRACT

Systems and methods are provided for addressing the complexity inherent in evaluating Service Oriented Architecture (SOA) systems by using meta-agent based adaptation in multi-agent systems. Embodiments of the present disclosure provide a multi-agent based automated evaluation capability for distributed, SOA systems that can dynamically adapt to the non-deterministic nature of such systems to enable a continuous monitoring capability for detecting and circumventing operational errors as they arise.

19 Claims, 5 Drawing Sheets

Related U.S. Application Data of application No. 15/625,136, filed on Jun. 16, 2017, now abandoned.

(60) Provisional application No. 62/351,084, filed on Jun. 16, 2016.

(51) Int. Cl.
*H04L 43/10* (2022.01)
*H04L 67/10* (2022.01)

(56) References Cited

U.S. PATENT DOCUMENTS

| | | | | |
|---|---|---|---|---|
| 2002/0078382 A1* | 6/2002 | Sheikh | .................... | H04L 63/20 |
| | | | | 709/224 |
| 2010/0082803 A1* | 4/2010 | Nguyen | ................. | G06Q 10/20 |
| | | | | 705/305 |
| 2011/0087625 A1* | 4/2011 | Tanner, Jr. | ............. | G06N 20/00 |
| | | | | 706/12 |
| 2016/0042321 A1* | 2/2016 | Held | ................ | G06Q 10/08355 |
| | | | | 705/338 |
| 2016/0117594 A1* | 4/2016 | Perez Ramos | ........... | G06N 5/04 |
| | | | | 706/14 |
| 2016/0226717 A1* | 8/2016 | Thorvaldsen | ....... | H04L 41/0856 |
| 2022/0021736 A1* | 1/2022 | Yang | ....................... | H04W 4/70 |

OTHER PUBLICATIONS

P. T. Saadi, M. M. Mardani, M. Shasadeghi and B. Safarinezhadian, "A fuzzy approach on consensus of nonlinear leader-follower multi-agent systems," 2015 4th Iranian Joint Congress on Fuzzy and Intelligent Systems (CFIS), Zahedan, Iran, 2015, pp. 1-5, doi: 10.1109/CFIS.2015.7391702. (Year: 2015).*

Ning, K., & Yang, R. (2006). MAS based embedded control system design method and a robot development paradigm. Mechatronics, 16(6),309-21. (Year: 2006).*

C. Guo and W. Xiong, "Research on model description method of multi-agent system," 2015 6th IEEE International Conference on Software Engineering and Service Science (ICSESS), Beijing, China, 2015, pp. 603-606. (Year: 2015).*

* cited by examiner

META-AGENT BASED ADAPTATION IN MULTI-AGENT SYSTEMS FOR SOA SYSTEM EVALUATION

CROSS REFERENCE TO RELATED APPLICATIONS

This application is a continuation of U.S. patent application Ser. No. 17/541,203, filed on Dec. 2, 2021, which is a continuation of U.S. patent application Ser. No. 15/625,136, filed on Jun. 16, 2017, which claims the benefit of U.S. Provisional Patent Application No. 62/351,084, filed on Jun. 16, 2016, all of which are incorporated by reference herein in their entireties.

FIELD OF THE DISCLOSURE

This disclosure relates to computer systems, including service oriented architecture systems.

BACKGROUND

Service-oriented architectures (SOAs) can be used to separate application functions into discrete services that can be accessed and used by different applications via a network. As the network grows to include additional services, evaluating the network can become an increasingly complex task. For example, the difficulty of automating the evaluation of SOAs is rooted in the need to effectively test an entire system-of-systems, as well as each of the system's discrete components. SOA systems comprise loosely coupled computing components that may include hardware services (virtualization), system services (infrastructure as a service), and web/software services (software as a service). Beyond loose coupling, a key to SOA systems' enhanced capabilities is their ability to integrate informational and computational resources, and thus, effective testing of SOA systems should evaluate both. Finally, the stability of an SOA system depends not only on the correct operation of each component system, but also on the state of the communication channels connecting them, as well as synchronization and timing of operations carried out by the system components.

The above considerations introduce a high degree of complexity for automating the evaluation of these systems. The nature of this complexity manifests in testing with respect to fault slippage, test turn-around time, repeatability, and test maintainability. SOA systems exhibit a high degree of dynamism. Service components are dynamically added, updated, and retired while the system remains operational and on-line. In the traditional software cycle, testing is an activity performed during the software development phase, before software is released for distribution. However, given the dynamism exhibited by SOA systems, this model is no longer appropriate. While testing individual software components can ensure their stability as standalone components, this does not predict their effect on the stability of an SOA system as a whole. Ensuring the ongoing stability of SOA systems requires a capability that can continuously evaluate the stability of the system, and take corrective actions when faults are detected. Current automation technology cannot address the complexity inherent in SOA systems.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
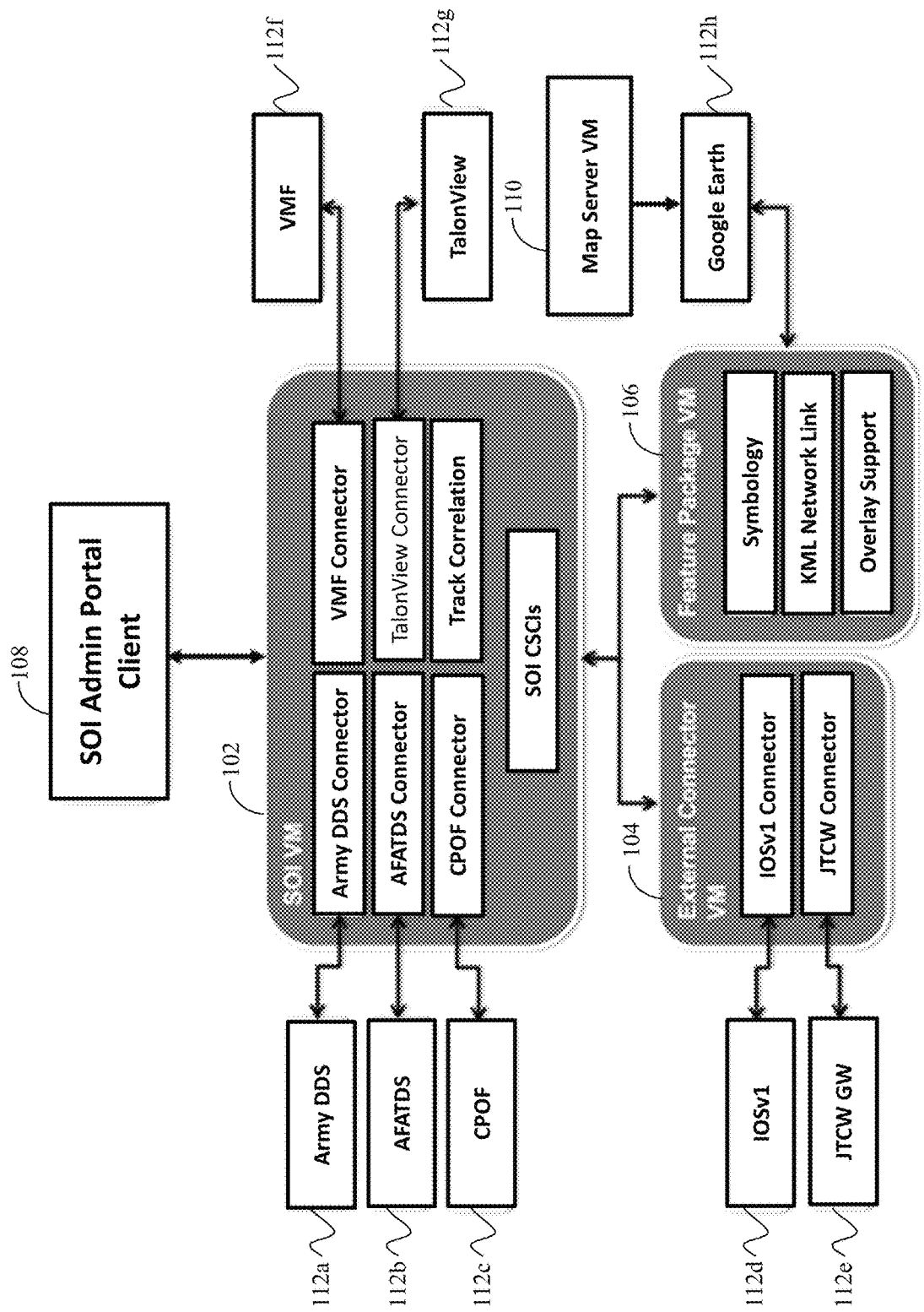
FIG. 1 is a diagram illustrating an exemplary SOA that can be used with embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

Embodiments of the present disclosure provide systems and methods that address the complexity inherent in evaluating Service Oriented Architecture (SOA) systems by using meta-agent based adaptation in multi-agent systems. For example, agent-based systems are by nature, distributed, autonomous, software components that can act in tandem by inter-agent communication and synchronization. This makes agent based systems much more appropriate for the automated evaluation of SOA systems. Embodiments of the present disclosure provide systems and methods for dynamically configuring meta-agents, enabling multi-agent based automated evaluation capability for distributed, SOA systems. The dynamically configured meta-agents in accordance with embodiments of the present disclosure can dynamically adapt to the non-deterministic nature of SOA systems to enable a continuous monitoring capability for detecting and circumventing operational errors as they arise.

2. AGENT-BASED SYSTEMS

Embodiments of the present disclosure can be configured to effectively automate the evaluation (testing) of SOA systems by using meta-agent based adaptation in multi-agent systems. For example, in agent-based systems, agents can be generically defined in terms of their state-space (belief), and the behaviors they can activate. In an embodiment, state-space contains information about the agent's environment, world, or domain that is relevant to the agent and can be in the form of name-value tuples.

In an embodiment, behaviors are actions that an agent can perform either reactively, in response to an incoming message, or proactively on a continuous or one-time basis. In an embodiment, agent designers can construct agents by defining the state information they hold and by implementing their behavior set. For example, implementing a behavior can comprise writing software code that implements one or more actions for that behavior. In some agent based software frameworks, common actions can be built in to an agent's capabilities to simplify the process of behavior development. In conventional agent-based systems, however, agent behaviors and state are predetermined for an agent at development time.

Some alternative approaches to using statically constructed agents include machine learning, automated agent selection, and dynamic agent configuration approaches. For example, regarding machine learning approaches, machine-learning techniques can be utilized to enable agents to adapt to, or learn about their environment. This approach enables agents to incrementally modify their behavior in response to input stimuli (e.g. changes in the environment). Regarding automated agent selection approaches, given a repository of agents with known capabilities as well as information regarding the anticipated function of an agent, an automated selection method can choose the most appropriate agent to fulfill the specified functions. A dynamic agent configuration approach can include a request based agent configuration approach where behaviors are dynamically reconfigured in an existing agent based on a transactional model (i.e., a user sends new actions to an agent and the agent replies with an acknowledgement).

While the above approaches can ameliorate the problems of dealing with dynamism in agent-based systems, none of them are ideal for dealing with the ongoing automated evaluation of SOA systems. Machine learning approaches can cause existing agents to adapt. However, this is not ideal for SOAs, as they introduce complete new (unlearned) functionality at test time. Machine learning alone is not ideal to deal with automated SOA evaluation that require completely novel agent structures to deal with new components added to the system. Similarly, while automated agent selection could potentially be used when knowledge of all of the requisite agent types is known a priori, in SOA environments it is not always possible to deterministically know all the required agents and/or behaviors necessary to execute or evaluate dynamically composed functionality. Finally, dynamic agent configuration requires user intervention to manually reconfigure agents to fulfill the requirements of evaluating a dynamic SOA system. Given the potential complexity and rapid evolution possible in SOA systems, a manual approach would be very labor intensive, making it impractical.

Traditional multi-agent based systems use agents that have behavior that is determined at development time. For example, in traditional agent-based systems, agent capabilities are fixed so agents are limited to a static set of capabilities. Embodiments of the present disclosure use agents with adaptive capabilities that are not limited to static, preconfigured behaviors. Embodiments of the present disclosure use a multi-agent framework that adapts dynamically through the creation of specialized agents.

In embodiments of the present disclosure, agents are created and populated with behaviors at runtime. The agents have the capability to create, configure, and remove other agents (e.g., at or after runtime). These capabilities enable the creation of meta-agents that can reason about the environment and create new agents automatically.

3. EXEMPLARY SOA

Service-oriented architectures (SOAs) can be used to separate application functions into discrete services that can be accessed and used by different applications via a network. For example, SOA systems are currently being developed and deployed on the tactical edge to provide warfighters with a common operating picture by integrating data from both new and legacy software systems into a coherent framework. The operational stability of these systems in what is often a highly dynamic, compromised environment will increasingly become critical to mission success.

FIG. 1 is a diagram illustrating an exemplary SOA that can be used with embodiments of the present disclosure, the Tactical Service Oriented Architecture (TSOA). In an embodiment, TSOA is a collection of software components that comply with the Marine Air-Ground Task Force (MAGTF) Command and Control (C2) software architecture. TSOA software components include Commercial Off-The-Shelf (COTS) software, Government Off-the-Shelf (GOTS) software, and the Service Oriented Infrastructure (SOI) software developed specifically for the operating forces using Open Architecture principles as defined in the TSOA Software Architecture Description Document (SADD). In an embodiment, SOI acts as a data broker that allows legacy, stove piped applications to publish their services and subscribe to other applications' services.

FIG. 1 illustrates exemplary components of the TSOA system, including a SOI virtual machine (VM) 102, an external connector VM 104, a feature package VM 106, a map server VM 110, a SOI admin portal client 108, and applications 112. In an embodiment, the applications 112 are able, through SOI (e.g., through SOA VM 102 and/or external connector VM 104 and feature package VM 106), to provide services to one another. For example, in a use case for a publish/subscribe service, the IOSv1 application 112*d* can publish enemy locations to SOI (e.g., via the IOSv1 connector of external connector VM 104). The AFATDS application 112*b* can subscribe to the SOI data feed (e.g., via the AFATDS connector of SOI VM 102) and can use the published enemy locations for fire support. The Google Earth application 112*h* can also subscribe to the SOI data feed (e.g., via feature package VM 106) and can display enemy positions overlaid on terrain.

While the TSOA is shown above as an example, it should be understood that embodiments of the present disclosure are not limited to working with the TSOA. For example, embodiments of the present disclosure can be used with any SOA and/or any other architecture that can be evaluated with agents.

4. DYNAMIC META-AGENT CONFIGURATION

Embodiments of the present disclosure include systems that introduce the idea of a dynamic meta-agent configuration capability through adaptation. In an embodiment, this capability serves as an enabler for reasoning in changing contexts, flexible configurations, and near real-time responsiveness and aims to address one of the biggest challenges faced by current multi-agent system development, which is agent awareness. Embodiments of the present disclosure support SOA test automation for regression (static) testing as well as a continuous, adaptive monitoring capability after deployment.

In embodiments of the present disclosure, meta-agents extend agent dynamism by introducing controller entities in the form of agents. This enables agents to create and populate other agents with behaviors based on current operational needs, thus mitigating the need for manual intervention or priori knowledge. Embodiments of the present disclosure include approaches that address the problems associated with automatic and dynamic evaluation of SOA systems.

Figure 2:
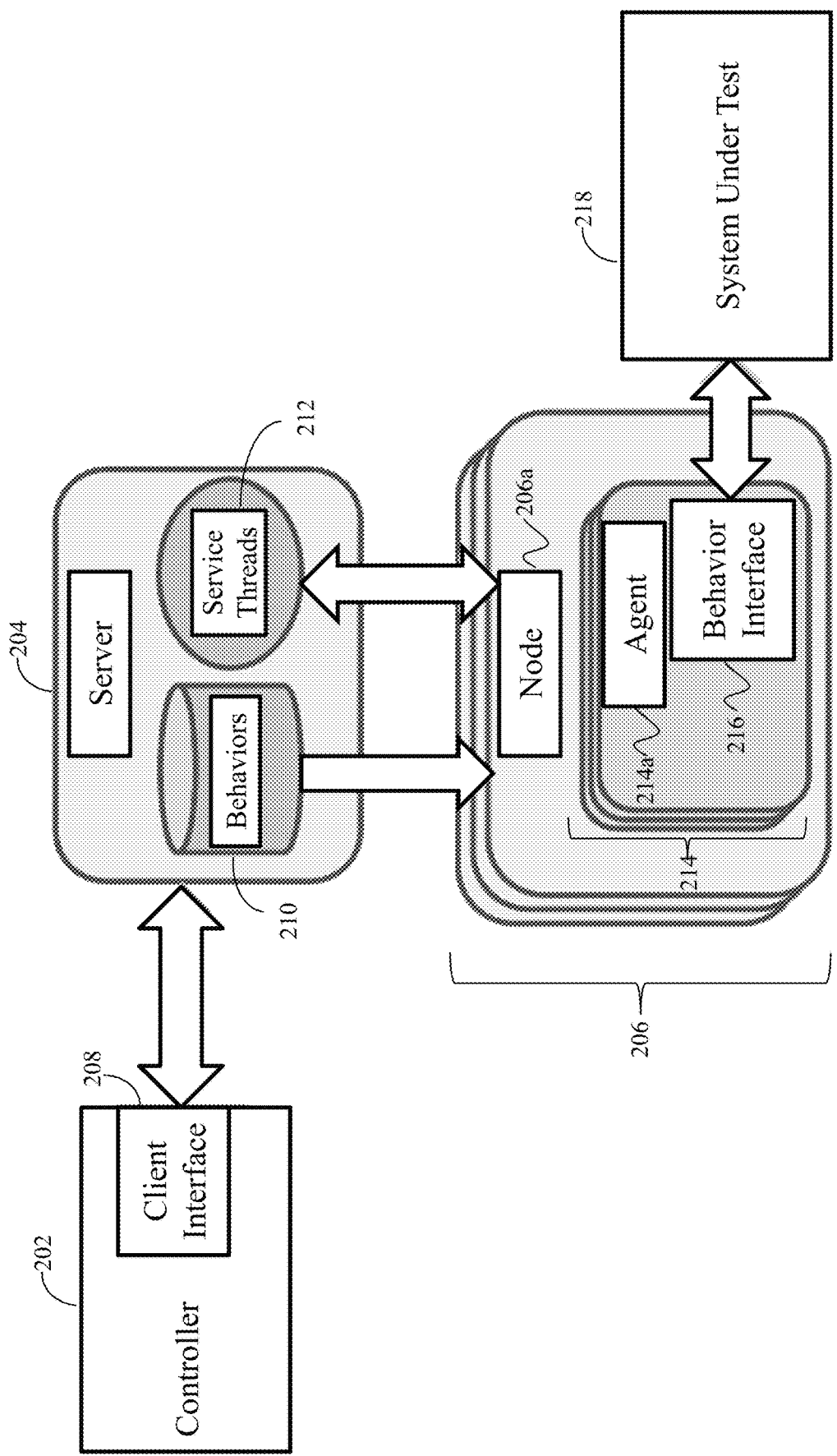
FIG. 2 is a diagram of an exemplary dynamic meta-agent configuration system in accordance with an embodiment of the present disclosure.

FIG. 2 is a diagram of an exemplary dynamic meta-agent configuration system in accordance with an embodiment of the present disclosure. The dynamic meta-agent configuration system of FIG. 2 includes a controller 202 (e.g., a controller device and/or a controller application), a server 204 (e.g., a server device and/or a server application), and a plurality of nodes 206 that can be used to evaluate a system under test 218. In an embodiment, system under test 218 is the SOA shown in FIG. 1 (e.g., in an embodiment the TSOA). In an embodiment, controller 202 includes client interface 208, and server 204 includes a repository of agent behaviors 210 and server threads 212. In an embodiment, each of nodes 206 can include a plurality of agents 214, and each of agents 214 can include a behavior interface 216. For example, node 206a includes agent 214a and behavior interface 216.

Each of controller 202, server 204, and/or nodes 206 can be implemented using hardware, software, and/or a combination of hardware or software. Further, each of controller 202, server 204, and/or nodes 206 can be implemented on the same device or on separate devices. Additionally, the devices used to implement controller 202, server 204, and/or nodes 206 can be general purpose devices (e.g., one or more computers) and/or special purpose devices. For example, in an embodiment, controller 202, server 204, and nodes 206 can be implemented as a single special purpose device for dynamic meta-agent configuration (e.g., in an embodiment, implemented using a single chip). In an embodiment, server 204 is a special purpose meta-agent device (e.g., a device that can create and/or manage meta-agents) and/or a special purpose agent device (e.g., a device that can create and/or manage agents).

In an embodiment, server 204 can contain a processor and a memory storing instructions that, if executed, enables server 204 to perform operations (e.g., instructions for creating agents based on a specification sent by controller 202). In an embodiment where controller 202 is also a device, controller 202 can also contain a processor and a memory storing instructions that, if executed, enables controller 202 to perform operations (e.g., instructions for sending a stored specification for creating agents and/or meta-agents to server 204 and for receiving results from server 204).

In an embodiment, controller 202, server 204, and nodes 206 are implemented using software programs that can be installed on a plurality of different devices. For example, in an embodiment, an instance of a runtime of a dynamic meta-agent configuration system in accordance with an embodiment of the present disclosure comprises one instance of server 204 (e.g., implemented using a special purpose device or a general purpose computer) and one or more instances of nodes 206, each running on either the server device 204 or on remote devices (e.g., on remote computers) with network connectivity to the server device 204.

A dynamic meta-agent configuration system in accordance with an embodiment of the present disclosure can be a multi-agent based framework written in a programming language, such as C++, Java, Python, JavaScript, etc., and can be both language and operating system agnostic. A dynamic meta-agent configuration system in accordance with an embodiment of the present disclosure can permit easy language agnostic extensibility and enhancement to support the introduction of new systems and ad hoc test tools.

In an embodiment, controller 202 creates and configures agents 214 (e.g., at runtime) and interfaces with server 204 via client interface 208. In an embodiment, server 204 provides a repository of agent behaviors 210 that can be used to create and configure new agents 214 (e.g., at runtime). In an embodiment, nodes 206 are containers for agents 214, and agents 214 residing at each node 206 have the ability to dynamically create and destroy other agents 214. Exemplary functionality of controller 202, server 204, nodes 206, agents 214, behaviors 210, and meta-agents will now be described in greater detail.

4.1 Controller and Server

In an embodiment, server 204 manages the communication between agents 214 and provides an interface for external devices and/or applications (e.g., controller 202) to control the runtime of the dynamic meta-agent configuration system. In an embodiment, server 204 does this through a language agnostic application programming interface (API) that allows applications (e.g., controller 202) to interface with a server instance either locally by running server 204 within the application's process, or remotely by connecting to server 204 running on the same computer or on a remote computer with network connectivity to the computer that server 204 is running on.

In an embodiment, client interface 208 gives controller 202 (e.g., in an embodiment, a control application) full control of an instance of the dynamic meta-agent configuration system. Controller 202 can create and destroy agents 214, manage agent behaviors 210, activate and deactivate agents 214, send messages to agents 214, retrieve behavior execution results and synchronize their execution with behaviors 210, and manage behavior delivery (e.g., based on the container target platform). Server 204 can maintain a repository of behaviors 210 that can be used to populate agents 214 at runtime. In an embodiment, controller 202 can further control synchronization of the dynamic meta-agent configuration system (e.g., between controller 202, server 204, and nodes 206).

4.2 Nodes

In an embodiment, nodes 206 have unique names and act as containers for agents 214. In an embodiment, while nodes 206 have globally unique names, agent names only have to be unique within the node (e.g., node 206*a*) that contains them. In an embodiment, addressing an agent in a runtime of a dynamic meta-agent configuration system requires both the node name as well as the agent name. In an embodiment, a node fulfills a number of functions including, but not limited to, handling incoming requests from other agents 214 for message delivery, agent creation and deletion, agent behavior management, agent activation and deactivation, file download and upload, scheduling the execution of agent behaviors 210, communicating with the sever 204 to deliver requests to remote agents, reporting the results of behavior execution back to the server 204, and implementing synchronization between agents 214.

4.3 Agents

In an embodiment, agents 214 are autonomous, active objects. In an embodiments, agents 214 contain a state space that comprises name-value tuples and a set of named behaviors. Agents in a dynamic meta-agent configuration system in accordance with an embodiment of the present disclosure can be constructed dynamically at runtime through requests from the server 204 or from other agents 214. This capability enables agents 214 to create and configure other agents 214 at runtime. In an embodiment, behaviors 210 are stored in a central repository on the server 204. In an embodiment, when a Behavior is added to an agent (e.g., agent 214*a*), its executable module is sent to the node (e.g., node 206*a*) containing the agent so that the node can schedule it for execution.

4.4 Behaviors

In an embodiment, behaviors 210 are units of execution that agents 214 can perform either reactively in response to an incoming message, or proactively on a continuous or one time basis. In an embodiment, behavior objects contain four methods for execution: setUp, action, message, and tearDown. However, it should be understood that any number of methods can be used with behavior objects and/or behaviors in accordance with embodiments of the present disclosure.

In an embodiment, the setUp method is called when a behavior is instantiated and is expected to perform initialization activities. In an embodiment, the action method implements the proactive execution of a behavior based on the execution mode specified. In an embodiment, the message method is called when an agent receives a message. For example, behaviors 210 can specify a topic filter comprising a list of topics that the behavior is interested in. In an embodiment, incoming messages that do not specify one of those topics in the topic filter are not propagated to the behavior. In an embodiment, the tearDown method is called on each behavior when an agent is deactivated. It can perform any de-initialization activities necessary to bring the system to a known state.

In an embodiment, proactive execution of a behavior can occur in a number of ways. For example, in an embodiment, OneShot execution can be used to activate the action method once when the agent is activated. In an embodiment, Periodic execution activates the action method continuously. TimedPeriodic execution can activate the action method every n milliseconds, and OnMessage execution can activate the action method upon the receipt of a specific message. In an embodiment, a delay value can be specified for proactive behaviors that delays their initial execution by a specified number of milliseconds. In an embodiment, the setup method, the action method, the message method, and the tearDown method can generate a result object that includes the result of the execution as well as a log of the activities performed during the execution. Result objects can be passed back to server 204 for logging and reporting (e.g., to controller 202).

4.5 Meta-Agents

Embodiments of the present disclosure introduce the idea of using meta-agents to evaluate SOA systems (e.g., the SOA system of FIG. 1). In an embodiment, meta-agents are agents that analyze the current state of an SOA system to detect trigger events that inject new requirements into the current agent framework. For example, one example of such an event is the addition of a new component to an online SOA system. Based on this analysis, meta-agents can automatically create and configure new agents 214 that address those new requirements. For example, meta-agents can dynamically perform an interoperability evaluation of a new component to ensure that its operation does not have detrimental effects on the SOA system. Alternatively, they can remove and destroy existing agents 214 that are no longer relevant. This capability enables a dynamic meta-agent configuration system in accordance with an embodiment of the present disclosure to evolve with the system under test 218 and is rooted in agents' ability to create and populate new agents with behaviors 210 from the server's 204 behavior repository. While meta-agents have been discussed herein with reference to SOA systems, embodiments of the present disclosure are applicable to a wide range of problems, and meta-agents in accordance with embodiments of the present disclosure can be used in conjunction with a variety of agent-based systems.

5. EXEMPLARY METHODS

Figure 3:
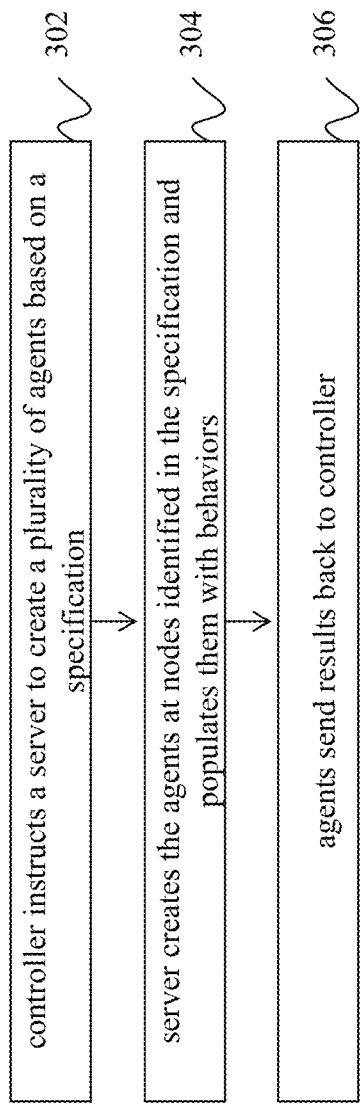
FIG. 3 is a flowchart of a method for evaluating an SOA using agents in accordance with an embodiment of the present disclosure.

FIG. 3 is a flowchart of a method for evaluating an SOA using agents in accordance with an embodiment of the present disclosure. In step 302, a controller instructs a server to create a plurality of agents based on a specification. For example, in an embodiment, controller 202 is a control application (e.g., executing on a general purpose computer or a special purpose device) that contains a specification of an agent network needed for executing a static test on system under test 218 (i.e., the SOA shown in FIG. 1). In an embodiment, the specification can identify locations (e.g., nodes at target devices and/or nodes at specific target applications executing on specific target devices) for agents to be created. In an embodiment, the specification can further include additional or modified behaviors for agents to use. Further, in an embodiment, the specification can contain instructions for removing and/or modifying existing agents. In an embodiment, a default set of instructions can be used for creating an agent (e.g., with default behaviors) if information for creating one or more specific agents isn't specified in the specification.

In step 304, a server creates the agents at nodes identified in the specification and populates them with behaviors. For example, in an embodiment, server 204 receives the specification from controller 202 and, based on information in the specification, creates agents 214 at nodes 206 on each target application machine of system under test 218. For example, in an embodiment, the target machine applications comprise AFATDS 112*b*, IOSv1 112*d*, and Google Earth 112*h*. In an embodiment, based on information in the specification, agents 206 are populated with behaviors 210 that interact with applications to carry out static test automation.

In step 306, agents send results back to the controller. For example, in an embodiment, agents 214 can generate results that can be passed back to the server 204 and/or the controller 202. For example, the specification sent by controller 202 may include behaviors that instruct created agents to report information back to controller 202 once a certain event has occurred.

Figure 4:
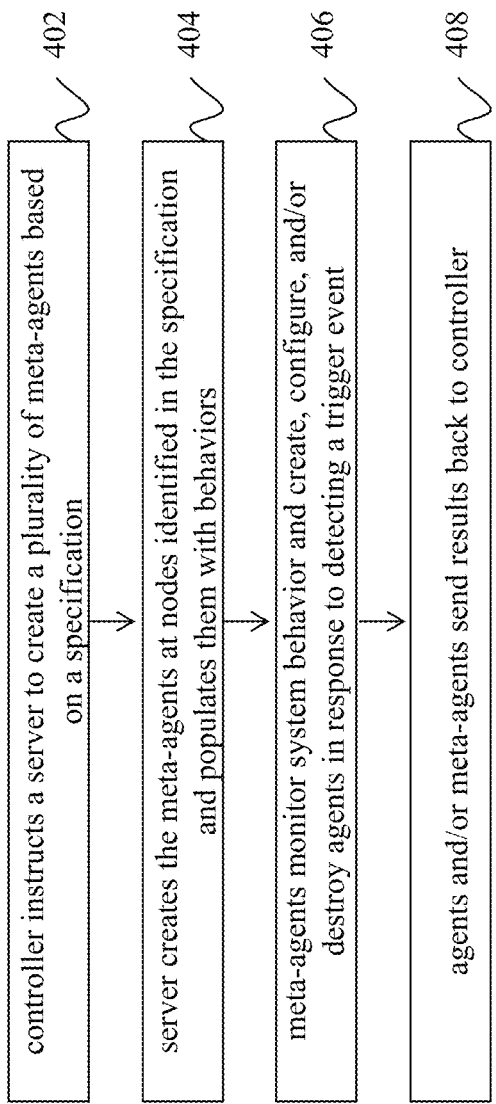
FIG. 4 is a flowchart of a method for evaluating an SOA using meta-agents in accordance with an embodiment of the present disclosure.

FIG. 4 is a flowchart of a method for evaluating an SOA using meta-agents in accordance with an embodiment of the present disclosure. In step 402, a controller instructs a server to create a plurality of meta-agents based on a specification. For example, in an embodiment, controller 202 contains a specification of a meta-agent network needed for executing a static test on system under test 218 (i.e., the SOA shown in FIG. 1). In an embodiment, the specification can identify locations (e.g., nodes at target devices and/or nodes at specific target applications executing on specific target devices) for meta-agents to be created. In an embodiment, the specification can further include additional or modified behaviors for meta-agents and/or agents created by the meta-agents to use. Further, in an embodiment, the specification can contain instructions for removing and/or modifying existing agents (and/or meta-agents). In an embodiment, a default set of instructions can be used for creating a meta-agent or agent (e.g., with default behaviors) if information for creating one or more specific meta-agents or agents isn't specified in the specification.

In step 404, a server creates the meta-agents at nodes identified in the specification and populates them with behaviors. For example, in an embodiment, server 204 receives the specification from controller 202 and, based on information in the specification, creates meta-agents at nodes 206 on each target application machine of system under test 218. In an embodiment, the meta-agents can have a similar structure as agents 214 (and meta-agents can also create, modify, and/or destroy other agents 214). In an embodiment, meta-agents are created at nodes 206 on all target machine applications (e.g., applications 112a-112h) for the SOA (e.g., the TSOA of FIG. 1) by default. In an embodiment, based on information in the specification, the meta-agents are populated with behaviors 210 that interact with applications at the target applications (e.g., applications 112a-112h).

In step 406, the meta-agents monitor system behavior and create, configure, and/or destroy agents in response to detecting a trigger event. For example, in an embodiment, the meta-agents at applications 112a-112h monitor system behavior and create and configure specialized agents 214 to periodically test and remediate or report problems in response to detecting trigger events (e.g., trigger events either specifically identified in the specification sent by controller 202 or default trigger events specified by server 204 based on information in behavior repository 210).

In step 408, agents and/or meta-agents send results back to the controller. For example, in an embodiment, the agents and/or meta-agents can generate results that can be passed back to the server 204 and/or the controller 202.

6. EXEMPLARY META-AGENT SYSTEM USED TO CONTROL A PLURALITY OF DEVICES

Embodiments of the present disclosure can be applicable to systems of networked devices, such as Internet of Things (IoT) systems. For example, IoT nodes are usually implemented as a System-on-a-Chip (SoC) and can act autonomously. A meta-agent capability in accordance with an embodiment of the present disclosure can enable IoT nodes to dynamically adapt their operations based on changes in the environment or operational needs.

Figure 5:
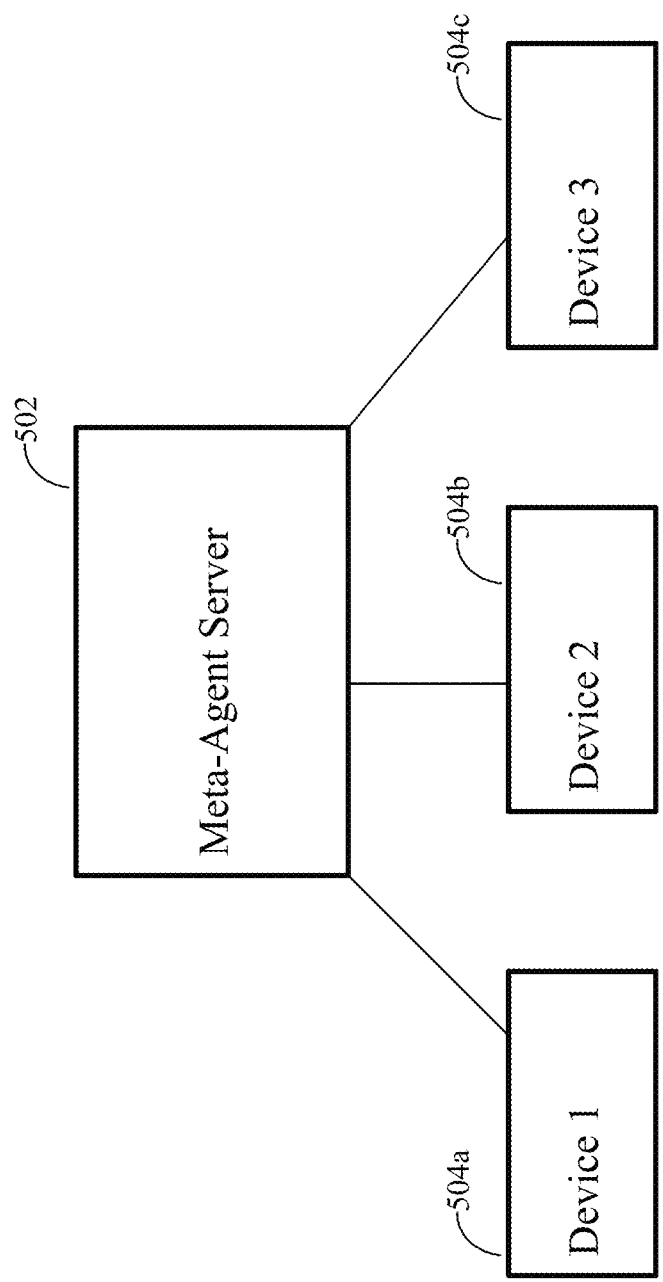
FIG. 5 is a diagram of an embodiment of an exemplary meta-agent system used to control a plurality of devices in accordance with an embodiment of the present disclosure.

FIG. 5 is a diagram of an embodiment of an exemplary meta-agent system used to control a plurality of devices in accordance with an embodiment of the present disclosure. In FIG. 5, a meta-agent server 502 can control a plurality of networked devices 504 using meta-agents in accordance with an embodiment of the present disclosure.

Devices 504 can include any series of devices configured to communicate with each other over a network in accordance with embodiments of the present disclosure. For example, in an exemplary IoT embodiment, devices 504 are a plurality of devices that can wirelessly communicate with each other in a home network. In an embodiment, devices 504 are a plurality of devices in separate locations connected to each other over the internet. In an embodiment, devices 504 do not communicate directly with each other but rather communicate through meta-agent server 502.

In an embodiment, meta-agent server 502 can be a single device that combines the capabilities of controller 202 and server 204. In an embodiment, meta-agent server 502 can be implemented as a special purpose device for controlling devices in a network. In an embodiment, meta-agent server 502 can be implemented using a general purpose computer implementing meta-agent server software for controlling devices in a network. Additionally, in an embodiment, meta-agent server 502 can be implemented on a device in the network of devices, such as device 504a, rather than on a separate device. For example, device 504a can act as a "master" device for other devices in the network (e.g., devices 504b and 504c). In an embodiment, rather than implementing meta-agent server 502 as a separate device, all devices in the network (e.g., devices 504a, 504b, and 504c) can implement the functionality of meta-agent server 502a. For example, at any one time, one of devices 504a, 504b, and 504c can be designated as the current master for the purposes of creating, destroying, and/or modifying meta-agents.

An example of home network IoT embodiment will now be discussed with reference to FIG. 5. In an embodiment, devices 504 are devices in a home network, and meta-agent server 502 is a special-purpose device managing devices 504. Meta-agent server 502 can create (e.g., with or without a specification) meta-agents at each of devices 504 and populate them with behaviors. The meta-agents at devices 504 can monitor the behavior of devices 504 and can optionally interact with applications executing at each of devices 504 (and/or logic or circuitry at each of devices 504). If the meta-agents detect a triggering event (e.g., specified in their behaviors), the meta-agents can create, configure, and/or destroy specialized agents to perform operations at devices 504 and/or report problems to meta-agent server 502.

7. EXEMPLARY ADVANTAGES

Embodiments of the present disclosure provide systems and methods for dynamically configuring meta-agents to evaluate SOA systems that enable a high degree of adaptability and require no human intervention. In an embodiment, systems and methods in accordance with embodiments of the present disclosure result in an approximately 75% reduction in labor effort required for testing when compared to current systems and methods for SOA evaluation that use manual testing.

Meta-agents in accordance with an embodiment of the present disclosure can reason about current needs and create specialized agents to address those needs. Further, embodiments of the present disclosure provide a high degree of adaptability required for ensuring stability of tactical SOA systems. For example, embodiments of the present disclosure enable meta-agents to create, destroy, and modify agents so that the agents that are created can adapt they system as changes occur without human intervention. This adaptability enabled by embodiments of the present disclosure greatly improves the efficiency, responsiveness, and stability of agent systems when compared to prior manually managed systems.

Embodiments of the present disclosure applicable to many SOA applications (e.g., banking) and can be extended to support the introduction of new SOA components without disrupting the operation of the system.

8. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A system, comprising:
a controller device configured to send a specification containing instructions for creating a plurality of meta-agents, wherein the specification identifies a plurality of trigger events; and
a server device in communication with the controller device, configured to:
receive the specification from the controller device, and
create the plurality of meta-agents at respective nodes in a plurality of nodes, wherein each meta-agent in the plurality of meta-agents is configured to:
detect a trigger event in the plurality of trigger events, wherein the trigger event comprises a detection of an addition of a component to the system,
determine requirements of the component,
create, based on the requirements, an agent in response to detecting the trigger event,
populate the agent with a plurality of behaviors stored at the server device, wherein behavior objects of the plurality of behaviors comprise:
a setUp method that is called when each behavior is initiated, wherein the setup method performs initialization activities for the agent,
an action method that implements execution of each behavior based on a specified execution mode, wherein the action method is configured to support a plurality of different execution modes,
a message method that is called when the agent receives a message, and
a tearDown method that is called when the agent is deactivated,
perform an interoperability evaluation of the component, wherein the interoperability evaluation ensures that addition of the component to the system will not have a detrimental effect on the system;
determine, based on the requirements and the interoperability evaluation, whether an existing agent is relevant to the system after the component has been added to the system, and remove the existing agent in response to determining that the existing agent is not relevant,
wherein each meta-agent in the plurality of meta-agents is configured to modify the existing agent in response to detecting the trigger event.

2. The system of claim 1, wherein the specification identifies the respective nodes in the plurality of nodes for creating the plurality of meta-agents.

3. The system of claim 1, wherein the plurality of meta-agents are configured to monitor respective target applications at the respective nodes in the plurality of nodes.

4. The system of claim 3, wherein the specification identifies the respective target applications for the plurality of meta-agents to monitor.

5. The system of claim 1, wherein the plurality of meta-agents are configured to monitor respective target devices at the respective nodes in the plurality of nodes.

6. The system of claim 5, wherein the respective target devices are configured to communicate with each other in an Internet of Things (IoT) system.

7. The system of claim 1, wherein the plurality of meta-agents are configured to send information to the controller device.

8. The system of claim 1, wherein the server device is configured to populate the plurality of meta-agents with a plurality of behaviors based on information in the specification.

9. The system of claim 1, wherein the server device is configured to populate the plurality of meta-agents with a plurality of behaviors based on information stored at the server device.

10. The system of claim 1, wherein a first meta-agent in the plurality of meta-agents is configured to perform an interoperability evaluation of the component.

11. The system of claim 1, wherein the setup method, the action method, the message method, and the tearDown method are configured to generate a result object that includes a result of an execution and a log of activities performed during the execution.

12. The system of claim 1, wherein the plurality of different execution modes comprise OneShot execution mode, a Periodic execution mode, a TimedPeriodic execution mode, and an OnMessage execution mode.

13. The system of claim 12, wherein the OneShot execution mode activates the action method once when the agent is activated, wherein the Periodic execution mode activates the action method continuously, wherein the TimedPeriodic execution mode activates the action method every n milliseconds, and wherein the OnMessage execution mode activates the action method upon receipt of a specific message.

14. A system, comprising:
a controller device configured to send a specification containing instructions for creating a plurality of meta-agents, wherein the specification identifies:
a plurality of trigger events,
a plurality of target applications executing at a plurality of nodes on a plurality of target devices, and
a plurality of behaviors for the plurality of meta-agents,
wherein the plurality of meta-agents are configured to:
monitor the plurality of target applications for one or more trigger events,
detect a trigger event in the plurality of trigger events, wherein the trigger event comprises a detection of an addition of a component to the system,
determine requirements of the component,
create, based on the requirements, an agent in response to detecting the trigger event,
populate the agent with a plurality of selected behaviors stored at a server device,
perform an interoperability evaluation of the component,
wherein the interoperability evaluation is configured to enable the plurality of meta-agents to determine whether the addition of the component has a detrimental effect on the system,
monitor, based on the requirements and the interoperability evaluation, whether an existing agent is relevant to updated requirements of the system caused by the addition of the component, and
remove the existing agent in response to determining that the existing agent is not relevant, and
an action method that implements execution of each behavior based on a specified execution mode, wherein the action method is configured to support a plurality of different execution modes; and
The server device in communication with the controller device, wherein the server device is configured to:
receive the specification from the controller device,
create the plurality of meta-agents at the plurality of nodes,
populate the plurality of meta-agents with behaviors based on information stored at the server device,
receive result information from a meta-agent in the plurality of meta-agents, and
send the result information to the controller device,
wherein each meta-agent in the plurality of meta-agents is configured to modify the existing agent in response to detecting the trigger event.

15. A method, comprising:
receiving, at a meta-agent device, a specification containing instructions for creating a plurality of meta-agents;
creating, at the meta-agent device, the plurality of meta-agents at respective nodes in a plurality of nodes;
detecting, at a meta-agent in the plurality of meta-agents, a trigger event in a plurality of trigger events, wherein the trigger event comprises a detection of an addition of a component to a system;
determining, at the meta-agent, requirements of the component;
creating, at the meta-agent and based on the requirements, an agent in response to detecting the trigger event;
populating the agent with a plurality of behaviors stored at a server device;
performing an interoperability evaluation of the component, wherein the interoperability evaluation ensures that addition of the component to the system will not have a detrimental effect on the system;
supporting a plurality of different execution modes for each behavior of the plurality of behaviors;
implementing execution of each behavior of the plurality of behaviors based on a specified execution mode;
determining, at the meta-agent and based on the requirements and the interoperability evaluation, whether an existing agent is relevant to the system after the component has been added to the system; and
removing, using the meta-agent, the existing agent in response to determining that the existing agent is not relevant,
wherein each meta-agent in the plurality of meta-agents is configured to modify the existing agent in response to detecting the trigger event.

16. The method of claim 15, wherein the specification identifies the respective nodes in the plurality of nodes for creating the plurality of meta-agents.

17. The method of claim 15, wherein the plurality of meta-agents monitor respective target applications at the respective nodes in the plurality of nodes.

18. The method of claim 17, wherein the specification identifies the respective target applications for the plurality of meta-agents to monitor.

19. The method of claim 15, further comprising:
populating the plurality of meta-agents with a plurality of behaviors based on information in the specification.

* * * * *